United States Patent
Gross

(10) Patent No.: US 8,356,773 B2
(45) Date of Patent: Jan. 22, 2013

(54) STRUCTURAL WING-FUSELAGE COMPONENT FOR CONNECTING TWO WINGS TO A FUSELAGE SECTION OF AN AIRCRAFT

(75) Inventor: Claus-Peter Gross, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 301 days.

(21) Appl. No.: 12/811,150

(22) PCT Filed: Dec. 30, 2008

(86) PCT No.: PCT/EP2008/011152
§ 371 (c)(1),
(2), (4) Date: Aug. 11, 2010

(87) PCT Pub. No.: WO2009/083262
PCT Pub. Date: Jul. 9, 2009

(65) Prior Publication Data
US 2010/0301165 A1  Dec. 2, 2010

Related U.S. Application Data

(60) Provisional application No. 61/017,649, filed on Dec. 30, 2007.

(30) Foreign Application Priority Data

Dec. 30, 2007   (DE) .......................... 10 2007 063 159

(51) Int. Cl.
*B64C 1/06* (2006.01)
(52) U.S. Cl. ............................ 244/131; 244/38; 244/119
(58) Field of Classification Search .................. 244/131, 244/38, 119, 123.1, 123.8, 120, 117 R
See application file for complete search history.

(56) References Cited

U.S. PATENT DOCUMENTS

| | | | |
|---|---|---|---|
| 3,735,524 A | 5/1973 | Staats et al. |
| 4,875,795 A | 10/1989 | Anderson |
| 4,904,109 A | 2/1990 | Anderson |
| 5,924,649 A | 7/1999 | Piening |

(Continued)

FOREIGN PATENT DOCUMENTS

| | | |
|---|---|---|
| DE | 19529706 A1 | 2/1997 |
| GB | 2435457 A | 8/2007 |

OTHER PUBLICATIONS

International Search Report for corresponding PCT application PCT/EP08/011152, dated Aug. 3, 2009.

(Continued)

*Primary Examiner* — Christopher P Ellis
*Assistant Examiner* — Medhat Badawi
(74) *Attorney, Agent, or Firm* — Matthew B. Dernier, Esq.; Gibson & Dernier LLP

(57) ABSTRACT

A structural wing-fuselage component for connecting two aerofoils to a fuselage section of an aircraft includes: a first wing shell component for the first wing and a second wing shell component for the second wing, with each component being made in a single piece and comprising a shell component on the wing side and a shell component on the fuselage side, where each shell component on the fuselage side comprises coupling parts and recesses in each case situated between the coupling parts, where in the installed state the coupling parts and the recesses of the shell component on the fuselage side for the first wing and of the shell component on the fuselage side for the second wing interlock, and where at least two coupling parts at their ends pointing away from the shell component on the wing side each comprises an extension part, a partially cylindrical fuselage shell component whose supporting rims include recesses which are engaged by the extension parts of the first wing shell components.

9 Claims, 3 Drawing Sheets

U.S. PATENT DOCUMENTS

| | | | |
|---|---|---|---|
| 6,851,646 B2 * | 2/2005 | Jones | 244/45 A |
| 6,929,219 B2 * | 8/2005 | Wojciechowski | 244/123.1 |
| 7,097,133 B2 * | 8/2006 | Elam | 244/3.29 |
| 7,316,372 B2 * | 1/2008 | Sarpy | 244/119 |
| 7,735,779 B2 * | 6/2010 | Griess et al. | 244/119 |
| 7,810,756 B2 * | 10/2010 | Alby et al. | 244/119 |
| 7,887,009 B2 * | 2/2011 | Keeler et al. | 244/131 |
| 2004/0079839 A1 * | 4/2004 | Bath et al. | 244/131 |

OTHER PUBLICATIONS

Thompson B. E., et al. "Sailplane Carry-Through Structures Made with Composite Materials" Journal of Aircraft, AIAA, vol. 33, No. 3 pp. 596-600, May 1996.

Written Opinion for corresponding PCT application PCT/EP08/011152, dated Aug. 3, 2009.

* cited by examiner

STRUCTURAL WING-FUSELAGE COMPONENT FOR CONNECTING TWO WINGS TO A FUSELAGE SECTION OF AN AIRCRAFT

CROSS REFERENCE TO RELATED APPLICATIONS

This application claims priority to PCT Application No. PCT/EP2008/011152, filed Dec. 30, 2008; which claims priority to German Patent Application No. DE 10 2007 063 159.8, filed Dec. 30, 2007, and claims the benefit to U.S. Provisional Patent Application No. 61/017,649, filed Dec. 30, 2007, the entire disclosures of which applications are hereby incorporated by reference.

BACKGROUND

The invention relates to a structural wing-fuselage component for connecting two wings to a fuselage section of an aircraft.

In this arrangement each of the two wings comprises a shell component that is integrated or is to be integrated in the upper shell of the wing, wherein the two shell components together form the structural wing-fuselage component.

Document U.S. Pat. No. 3,735,524 describes a wing assembly for a toy airplane including a pair of wing halves with inter-fitting inner ends that lie on the airplane fuselage.

In the state of the art, wing-fuselage connections have hitherto been formed by means of a wing box. The wing box is a component that is separate from the aerofoils, which component mostly comprises various parts, wherein in order to form the wing box the parts are welded together and/or interconnected by way of connecting elements. As a rule, the wing box is made from metal. Over time it is possible for corrosion to occur. The wing box comprises connecting elements for connecting the wing or the fuselage, which connections are also as a rule made from metal.

The connection of, in particular, the aerofoils requires very considerable installation effort that is associated with high costs. This arrangement is associated with a disadvantage in that in the connection between the wing and the wing box the load is transferred around corners, which reduces the stability of the connection and has an unfavourable influence on the load transfer from the wing to the fuselage.

It is the object of the invention to create a wing-fuselage connection in an aircraft, which connection makes it possible to install the aerofoils in a simpler manner with fewer parts than was possible up to now.

SUMMARY OF THE INVENTION

This object is met by way of one or more embodiments disclosed and described herein.

The structural wing-fuselage component is used to connect two aerofoils to a fuselage section of an aircraft and comprises an upper shell of the wing with a first upper shell component of the first wing and a second upper shell component of the second wing, wherein each of the two upper shell components is made in a single piece. The first and the second upper shell component of the wing each comprise a shell component on the wing side and a shell component on the fuselage side.

Each of the shell components on the fuselage side comprises at least two coupling parts that extend in the wingspan direction, and at least two recesses, released by the coupling parts, wherein the coupling parts and the recesses are designed in such a way that in the installed state they interlock, wherein the at least two coupling parts at their ends away from the associated wing comprise an upward-extending extension part.

Furthermore, the structural wing-fuselage component comprises a lower shell of the wing that together with the upper shell of the wing forms a wing section that extends transversely through the fuselage, and comprises an upper shell component of the fuselage with a first supporting rim on the side of the first wing, and a second supporting rim on the side of the second wing, wherein the first supporting rim comprises recesses which in each case are engaged by extension parts of the second wing, and wherein the second supporting rim comprises recesses which are engaged by extension parts of the first wing.

The recesses on each of the two shell components on the fuselage side can in each case be formed between two coupling parts which, for example, extend in a finger-shaped manner in the wingspan direction, and/or beside a coupling region in the rim region of the respective shell component on the fuselage side.

In this arrangement the recesses of the two shell components on the fuselage side can be formed as indentations in each case between or beside two coupling parts, or the recesses are openings which in each case receive a connecting part which extends in a finger-shaped manner, in the wingspan direction, of the respective other shell component on the fuselage side.

The recesses of the upper shell component of the fuselage can also be indentations which in each case receive an elevation of an extension part of the respective other upper shell component of the fuselage.

Irrespective of the design of the recesses and of the coupling parts that interact with them it is decisive that in the connected state they interlock and are interconnected in such a manner that they form a pressure bulkhead section vis-à-vis the interior of the fuselage upper shell component that forms part of the aircraft fuselage, which among other things comprises the passenger cabin.

The finger-shaped coupling parts can, for example, be in the shape of an elongated rectangle or in the form of a triangle, for example an isosceles triangle. They can comprise undulating or serrated lateral contours that point transversely to the wingspan direction, or they can comprise amorphous circumferential contours. In that case the recesses comprise the negative shape of the coupling part, so that always a closed surface results when the coupling part and the recesses interlock.

In this arrangement the connection between the recesses and the coupling parts can, for example, be an adhesive connection or a welded connection, but the connection can also be established by way of connecting elements that safely interconnect the recesses and the coupling parts. The connecting elements can, for example, be clamps, screws, etc., available from sources known in the art.

The shell components are of an axial length in the direction of the longitudinal axis of the aircraft, which axial length can essentially correspond to the axial length of the upper shell component of the fuselage. In this arrangement the upper shell component of the fuselage can comprise the shape of an open ring, wherein the open ends of the ring are opposite each other in one plane and comprise a spacing that essentially corresponds to the length of the shell components on the fuselage side in the wingspan direction. The upper shell component of the fuselage can be bonded, welded or connected to the shell components by way of connecting elements. In this way a section of the aircraft cabin is created in which the upper shell component of the fuselage forms the upper exterior skin of the cabin, while the connected shell parts form a support for the cabin floor. This means that both the connection between the two shell components on the fuselage side, and the connection between the shell components and the upper shell of the fuselage need to be designed in such a manner that an airtight connection is established which can withstand the occurring pressure differentials between the interior pressure of the cabin and the exterior pressure of the atmosphere. This can be achieved by means of integral connections, for example adhesive connections or welded connections, or by means of connecting elements, wherein in this case additional sealing means may be necessary.

The lower shell of the wing can comprise a first lower shell component of the wing for the first wing and a second lower shell component of the wing for the second wing. In this arrangement the two lower shell components of the wing at their facing ends on the fuselage side may, for example, comprise interlocking elements by means of which they are interconnectable. The connection can be an adhesive connection or a welded connection, or it can also be established by way of separate connecting elements.

The lower shell of the wing can, however, also be made in a single piece, which makes possible particularly simple and quick installation and at the same time has a positive influence on the strength of the entire wing construction.

The connection between the upper shell of the wing and the lower shell of the wing can be established by way of connecting elements; as an alternative the upper shell of the wing can be bonded or welded to the lower shell of the wing or it can be firmly connected to it in some other manner.

The shell component and/or the upper shell of the wing can be made in a single piece, in other words they are made in a single production process. They can be made from a composite material, for example an identical composite material, wherein the composite material comprises main fibres that are continuously laid in the shell component and extend without any interruption from the end of the shell component on the wing side to the end of the shell component on the fuselage side. If the entire upper shell of the wing is made in a single piece, or if the shell component on the wing side forms the upper shell of the wing, then the main fibres can be continuously laid in the upper shell of the wing, and can extend without interruption from the tip of the upper shell of the wing right through to the end of the shell component on the fuselage side, in other words right to the end of the extension parts on the fuselage side. In both cases the main fibres in the respective component extend in the wingspan direction, in other words essentially parallel to a longitudinal axis of the wing in the wingspan direction.

If in addition the lower shell of the wing is also made from a composite material, then said lower shell of the wing, too, can comprise main fibres, wherein the main fibres are continuously laid in the lower shell of the wing, and extend without interruption from one tip of the lower shell of the wing to the other tip of the lower shell of the wing. In this arrangement the composite material can be identical to that of the upper shells of the wing; however, it is also possible to use some other composite material.

Apart from the main fibres, the composite material can comprise further fibres, which extend, for example, essentially perpendicularly to the main fibres. Further fibres can, at any desired other angles to the main fibres, form further components of the composite material. These other angles can have any value between 1° and 89°, in particular 45° or 60°. The main fibres and the further fibres can be woven, bonded or sewn together and can together form a scrim. This scrim can be embedded in a carrier material or substrate.

The upper shell of the wing and the lower shell of the wing together can form a wing box. At least one spar of the fuselage can be integrated in the upper shell of the wing and/or in the lower shell of the wing.

Even though the structural wing-fuselage component is described in this document only with reference to the example of a wing, the average person skilled in the art can apply the described principle of connection also to other wing-fuselage connections, for example in the case of rigid slats or tail wings.

BRIEF DESCRIPTION OF THE DRAWINGS

Below, exemplary embodiments of the invention are described in more detail with reference to diagrammatic illustrations. The following are shown.

DETAILED DESCRIPTION OF THE INVENTION

Figure 1:
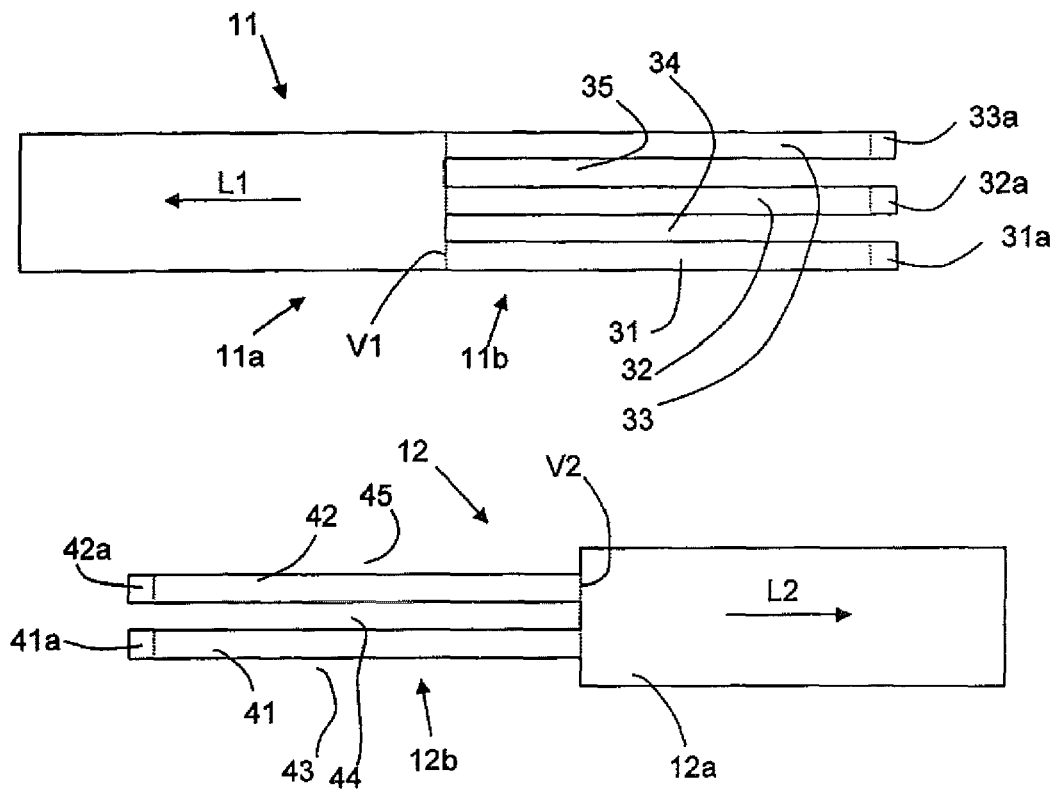
FIG. 1 a diagrammatic top view of two inventive complementary upper components of wing shells, in each case an upper shell of an aerofoil, wherein for the sake of clarity their extension parts have been shifted to the viewing plane.

To avoid repetition, in the following description and in the figures at least in part the same reference characters are used for identical modules and components, provided the description does not require further differentiation.

According to the invention, a structural wing-fuselage component B for connecting two upper components of wing shells 11, 12, which in each case are associated with one of the two aerofoils F1, F2, comprises a fuselage shell component 30 or upper shell component 50 of the fuselage or a lower shell component of a fuselage section 3 of an aircraft. FIG. 1 shows an exemplary embodiment of an inventive upper component of a wing shell 11 with a longitudinal direction L1. As intended, the upper component of the wing shell 11 is integrated in the wing F1 in such a manner that the longitudinal direction L1 extends in the wingspan direction S1 of the wing F1. The upper component of the wing shell 11 comprises two partial sections, namely a shell component 11a on the wing side, and a shell component 11b on the fuselage side, which are arranged one behind the other when viewed in longitudinal direction L1.

The two shell components 11a, 11b are formed in a single piece or are produced in a single piece. The longitudinal direction L1 extends from the shell component 11b on the fuselage side to the shell component 11a on the wing side; it can also be curved, depending on the shape of the shell component 11a, 11b. In the region of the transition from the shell component 11a on the wing side to the shell component 11b on the fuselage side the two shell components 11a, 11b form an obtuse angle at an imaginary connection line. The size of this obtuse angle depends on the installation situation of the upper component of the wing shell 11 or of the aerofoil F1, F2. In other embodiments there is no angle between the shell component 11b on the fuselage side and the shell component 11a on the wing side. In particular, the longitudinal direction from the shell component 11b on the fuselage side to the shell component 11a on the wing side can extend continuously and/or at the same direction of curvature, i.e. the angle can also be 180 degrees.

The shell component 11a on the wing side is shaped as a closed quadrangle, while the shell component 11b on the fuselage side in the exemplary embodiment shown comprises the form of a fork end with three finger-shaped coupling parts 31, 32, 33 in the shape of elongated rectangles which between themselves form two recesses 34, 35 in the form of openings, and also have the shape of elongated rectangles. The coupling parts 31, 32, 33 and the recesses 34, 35 each extend, for example, from the imaginary connection line V1 to the end of the shell component 11b on the fuselage side, which end points to the fuselage. However, it may also be sufficient if the coupling parts 31, 32, 33 and the recesses 34, 35 extend only over some of the length of the shell component on the fuselage side in the direction of the wingspan. Likewise, it is not mandatory for the finger-shaped coupling parts 31, 32, 33 and recesses 34, 35 to be rectangular in shape; they could just as well comprise a triangular shape or any other shape. In this arrangement the shape of the coupling parts 31, 32, 33 determines the shape of the recesses 34, 35 and vice versa.

The number of coupling parts and recesses can also vary. For example, the shell component 11b on the fuselage side can comprise only one coupling part and one recess each which are then arranged side-by-side in axial direction of the aircraft fuselage. The maximum number of coupling parts and recesses is limited by design specifications. In this arrangement, in a manner that differs from that shown in FIG. 1, the coupling parts and recesses can as an alternative or in addition be formed at rims of the shell component 11b on the fuselage side, which rims are directed transversely to the longitudinal direction L1. Finally, the shell component 11b on the fuselage side can comprise any desired shape, for example the shape of a cross, wherein in this case the cross forms the coupling part of a first wing shell component, while the recess of the other wing shell component comprises a shape that matches the surroundings of the coupling part in the plane of the coupling part. Conversely, the cross can also be formed as a recess in the shell component 11b on the fuselage side.

The at least one recess 34, 35 of the shell component 11b on the fuselage side can also be an indentation in which in each case an elevation of an extension part of the respective other shell component on the fuselage side is received. In this arrangement the recesses can either be designed as through-holes of whatever shape, or they can reach only over part of the material thickness into the material of the shell component on the fuselage side, in other words they are blind holes instead of through-holes. In this arrangement all the recesses can be formed on a shell component on the fuselage side, and the coupling parts can be formed on the other shell component on the fuselage side, or each of the two shell components on the fuselage side comprises both recesses in the form of indentations, and coupling parts in the form of coupling parts that project in the direction of connection. If the recesses are holes, the two coupling parts on the fuselage side, which coupling parts are to be connected, can be placed one on top of the other in order to establish the connection; in other words, in the region of the connection the shell component in the connected state comprises a thickness which when measured perpendicularly to the cabin plane of the aircraft corresponds to the thickness of the base bodies, i.e. without recesses or coupling parts, of the two shell components on the fuselage side. In this arrangement the coupling parts can project from the base body of the shell component on the fuselage side, on which base body they are formed, by a dimension that essentially corresponds to the thickness of the shell component 11b on the fuselage side, which shell component 11b receives said coupling parts.

The upper shell component 11 of the wing can comprise a composite material with main fibres (not shown) that extend continuously along the entire length of the upper shell component 11 of the wing, in other words the main fibres extend without interruption from the wing-side end of the upper shell component 11 of the wing to the fuselage-side end of the upper shell component 11 of the wing. Apart from the main fibres, furthermore, other fibres (not shown), which extend, for example, perpendicularly to the main fibres or extend in any other desired angle to the main fibres, can form part of the composite material. In this arrangement the upper shell component 11 of the wing can form part of an upper shell 10 of the wing, or it can itself form the upper shell 10 of the wing.

On the coupling parts 31, 32, 33 of the upper shell component 11 of the wing in FIG. 1, extension parts 31a, 32a, 33a are formed which on the fuselage-side ends extend in longitudinal direction at an angle to the extension of the arrangement of the interlocking shell components 11b, 12b on the fuselage side, wherein the purpose of said extension parts 31a, 32a, 33a will be explained in more detail in the context of FIG. 5. The ends on the fuselage side of these extension parts 31a, 32a, 33a are identical to the ends of the coupling parts 31, 32, 33 on the fuselage side. In the exemplary embodiment shown in the figures the extension parts 31a, 32a, 33a project upwards at an angle relative to the extension of the remaining part of the shell components 11b, 12b on the fuselage side.

Figure 2:
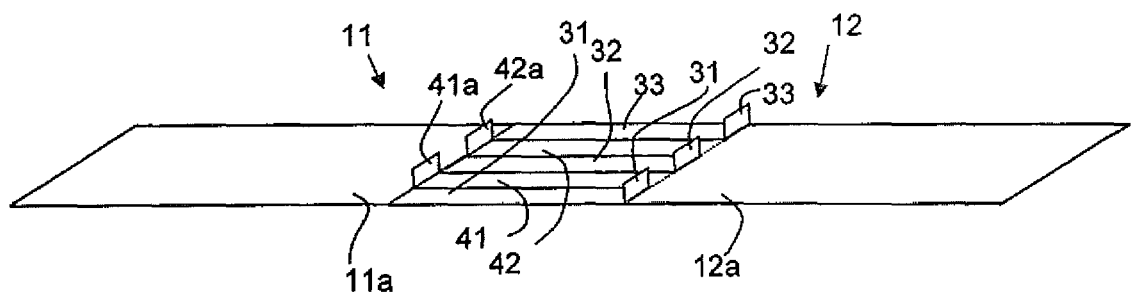
FIG. 2 a diagrammatic view of upper components of wing shells of two upper shells of two wings, in their joined state.

FIG. 2 shows two upper shell components 11, 12 of the wing in the state assembled as intended, wherein the coupling parts 31, 32, 33 of the shell component 11b, on the fuselage side, of the first wing shell component 11 engage, or are situated in, the recesses 43, 44, 45 of the shell component 12b on the fuselage side of the second wing shell component 12, and the coupling parts 41, 42 of the shell component 12b on the fuselage side of the second wing shell component 12 engage, or are situated in, the recesses 34, 35 of the shell component 11b on the fuselage side of the first wing shell component 11. To establish a fixed connection between the two upper shell components 11, 12 of the wing the two interlocking shell components 11b, 12b on the fuselage side can be bonded or welded together or can be non-detachably interconnected by way of connecting elements or in some other manner.

Figure 3:
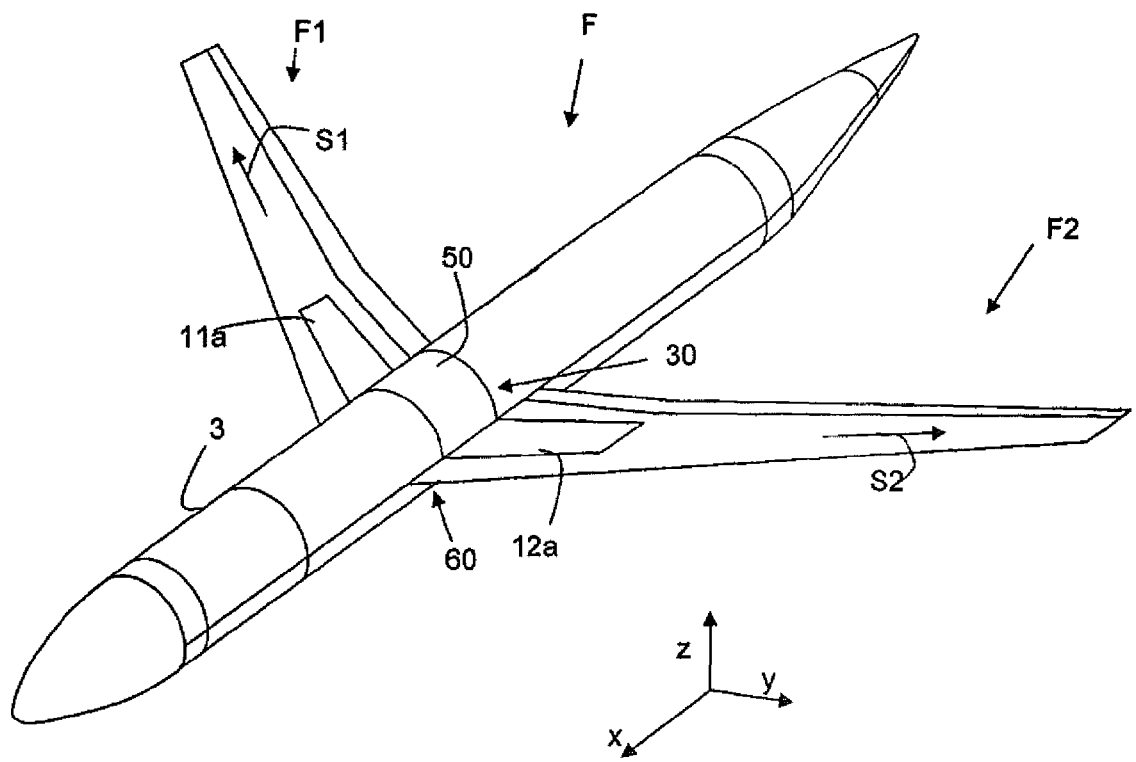
FIG. 3 the installation situation of the upper components of the wing shells on the aircraft.

FIG. 3 shows the upper shell components 11, 12 of the wing in the installed situation on the aircraft, wherein only those components that are essential to the installation are shown. Each of the two upper shell components 11, 12 of the wing is connected to a shell component 11a, 12a on the wing side. The two shell components 11b, 12b on the fuselage side of the upper shell components 11, 12 of the wing are interconnected as described above and in the connecting region are supported by a lower shell (not designated) of the fuselage. In this arrangement the lower shell of the fuselage is connected to the shell components on the fuselage side by way of connecting elements or alternative fasteners. The fuselage shell can comprise a keel beam, a landing gear bay and/or a pressure bulkhead that follows on from the connecting region of the upper shell components 11, 12 of the wing in the direction of the rear of the aircraft.

In addition to the upper shell 10 of the wing, the wings 1, 2 comprise a lower shell 20 of the wing. In the exemplary embodiment the upper shell 10 of the wing and the lower shell 20 of the wing form a central wing box. The connected shell components 11b, 12b on the fuselage side form a part of the pressure bulkhead, which part is in the front when viewed in axial direction of the aircraft.

Figure 4:
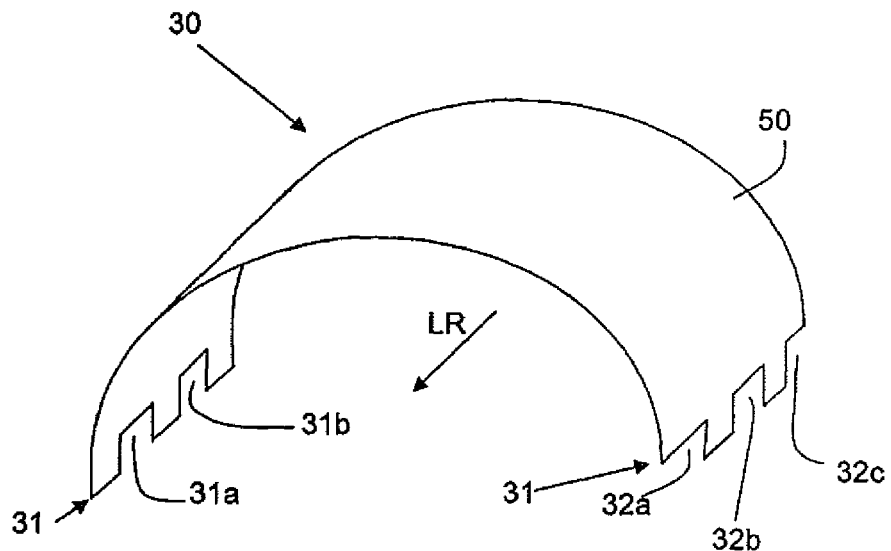
FIG. 4 an inventive upper shell component of the fuselage.

FIG. 4 shows an upper shell component 50 of the fuselage that is designed for connection to the upper shell components 11, 12 of the wing. The upper shell component of the fuselage comprises the shape of an interrupted ring. The upper shell component 50 of the fuselage is thus a partially cylindrical fuselage shell component 30 with two supporting rims that are aligned transversely to its longitudinal direction and that are situated opposite each other. The two ends or supporting rims of the open ring face each other in a plane, with the distance of the two ends in the exemplary embodiment shown essentially corresponding to the length, measured in the wingspan direction, of the shell components 11b, 12b on the fuselage side, or of the connecting region formed by the shell components 11b, 12b on the fuselage side.

In its assembled state the upper shell component 30 of the fuselage comprises a first supporting rim 51 situated on the side of the first wing shell component 11, and a second supporting rim 52 situated on the side of the second wing shell component 12, wherein the first supporting rim 51 comprises recesses 51a, 51b which in each case are engaged by extension parts of the second wing, and wherein the second supporting rim 52 comprises recesses 52a, 52b, 52c which are engaged by extension parts of the first wing F1.

On one end of the open circle, which end forms a first supporting rim 51, two recesses 51a, 51b are formed, while on the opposite end, which forms a second supporting rim 52, three recesses 52a, 52b, 52c are formed. The extension parts 31a, 32a, 33a; 41a, 42a that are formed on the ends on the fuselage side of the coupling parts 31, 32, 33; 41, 42 can engage, with positive fit, these recesses 51a, 51b; 52a, 52b, 52c. In this way the upper shell component 30 of the fuselage is connected to the upper shell components 11, 12 of the wing. In the region of engagement and along the first supporting rim and the second supporting rim the interlocking recesses 51a, 51b; 52a, 52b, 52c and coupling parts 31, 32, 33; 41, 42 can be detachably or non-detachably interconnected, for example bonded or welded together, by way of connecting elements or alternative fastening methods.

Figure 5:
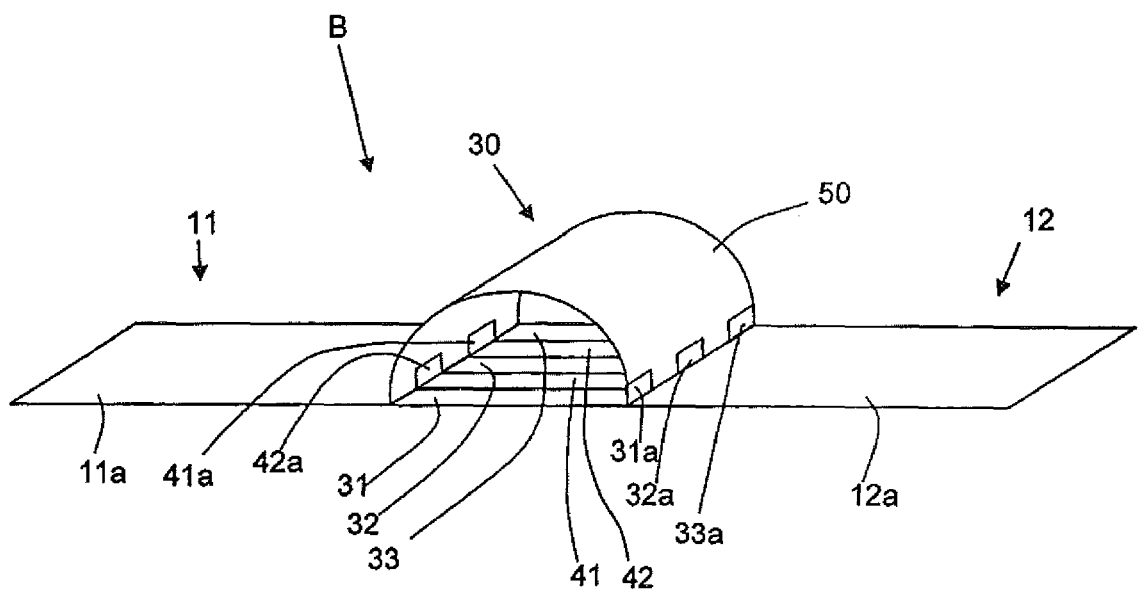
FIG. 5 a diagrammatic view of an arrangement comprising the upper shell component of the fuselage according to FIG. 4, with two upper components of wing shells joined in a complementary manner according to FIG. 2.

FIG. 5 diagrammatically shows an arrangement comprising the upper shell component of the fuselage according to FIG. 4 with two upper components of wing shells, which components were complementarily joined according to FIG. 2, while FIG. 3 shows the structural wing-fuselage component B installed in an aircraft. The aerofoils F1, F2, which are connected by way of the upper shell components 11, 12 of the wing, and the upper shell component 50 of the fuselage, which upper shell component 50 is also connected to the upper shell components 11, 12 of the wing, form one unit. The connections between the upper shell components 11, 12 of the wing can be established in a simple and safe manner, wherein the number of necessary connecting elements depends on the type of connection. If the upper shell components 11, 12 of the wing are, for example, bonded together, it may be possible to entirely do without any additional connecting parts. This also applies to connecting the upper shell component 30 of the fuselage to the upper shell components 11, 12 of the wing.

Instead of using an upper shell component 50 of the fuselage, it is also possible to use a lower shell component 60 of the fuselage, which lower shell component 60 of the fuselage in its state where it is integrated in the aircraft structure is situated opposite the upper shell component 50 of the fuselage so that generally a fuselage shell component 30 is used.

The invention claimed is:

1. A structural wing-fuselage component for connecting two aerofoils to a fuselage section of an aircraft, comprising:
   a first wing shell component for the first wing and a second wing shell component for the second wing, with each component being made in a single piece and comprising a shell component on a wing side and a shell component on a fuselage side, wherein integration of the shell component on the wing side in the respective wing is provided such that a longitudinal direction of the respective shell component on the wing side extends in the direction of a wingspan of the respective wing;
   wherein each shell component on the fuselage side comprises at least two coupling parts that extend opposite to the longitudinal direction, and at least two recesses in each case situated between the coupling parts, wherein the coupling parts and the recesses are designed in such a manner that in an installed state the coupling parts and the recesses of the shell component on the fuselage side for the first wing and of the shell component on the fuselage side for the second wing interlock, and
   wherein at least two coupling parts at their ends pointing away from the shell component on the wing side each comprises an extension part that extends at an angle to the longitudinal direction; and
   a fuselage shell component with two supporting rims that are aligned transversely to its longitudinal direction and that are situated opposite each other, wherein the first supporting rim, on the shell component located on the wing side of the first wing, comprises recesses which in each case are engaged by extension parts of the second wing shell component, and wherein the second supporting rim comprises recesses which are engaged by extension parts of the first wing shell component.

2. The structural wing-fuselage component according to claim 1, wherein the wing shell components are upper shell components of the wing or lower shell components of the wing.

3. The structural wing-fuselage component according to claim 1, wherein a lower shell of the wing is provided, which together with upper shell components of the wing, forms a wing section that extends transversely through the fuselage.

4. The structural wing-fuselage component according to claim 1, wherein the fuselage shell component is an upper shell component of the fuselage.

5. The structural wing-fuselage component according to claim 1, wherein:
   the recesses are openings that are open on a side opposite the shell components on the fuselage side, and
   in each case the recesses extend between two coupling parts that extend in a finger-shaped manner in longitudinal direction, and/or beside a coupling part in a rim region of the respective shell component on the fuselage side.

6. The structural wing-fuselage component according to claim 1, wherein the recesses of the shell component on the fuselage side are indentations in each case between two coupling parts.

7. The structural wing-fuselage component according to claim 1, wherein the recesses of the upper shell component of the fuselage are openings.

8. The structural wing-fuselage component according to claim 1, wherein the recesses of the upper shell component of the fuselage are indentations which in each case receive at least one section of an extension part.

9. The structural wing-fuselage component according to claim 1, wherein the recesses and the coupling parts interlock and are interconnected in such a manner that they form a pressure bulkhead section vis-à-vis an interior of an upper shell component of the fuselage.

* * * * *